March 24, 1942.    F. H. ROBY    2,277,146
SYSTEM OF ELECTRIC WELDING
Filed March 4, 1939    3 Sheets-Sheet 2
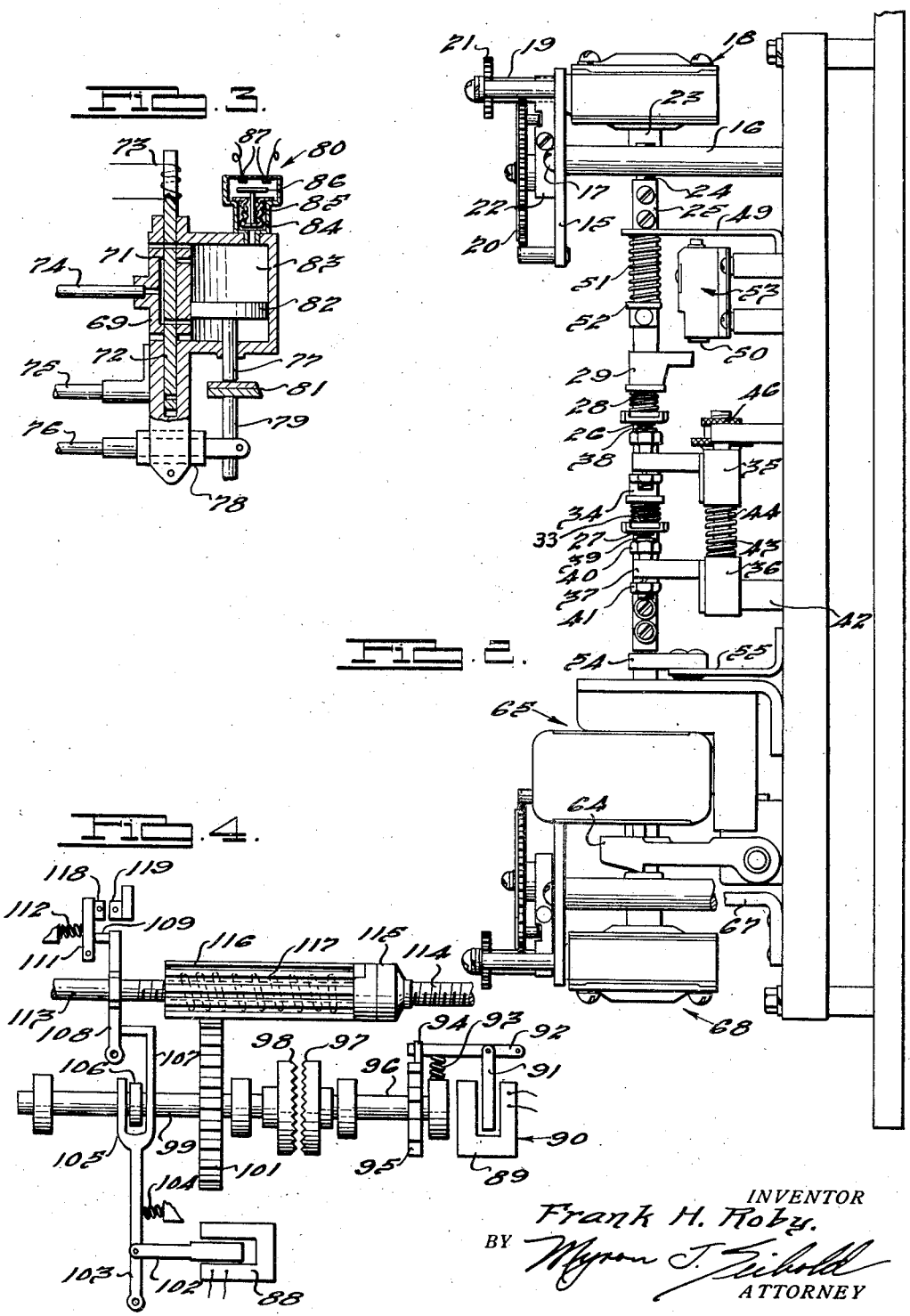
INVENTOR
Frank H. Roby.
BY
ATTORNEY March 24, 1942.   F. H. ROBY   2,277,146
SYSTEM OF ELECTRIC WELDING
Filed March 4, 1939   3 Sheets-Sheet 3
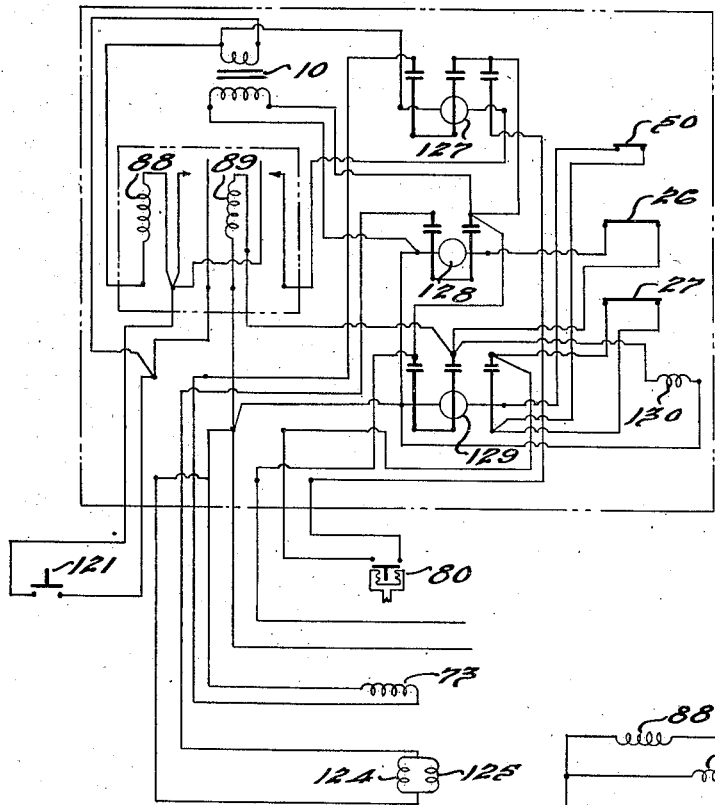
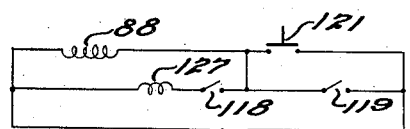
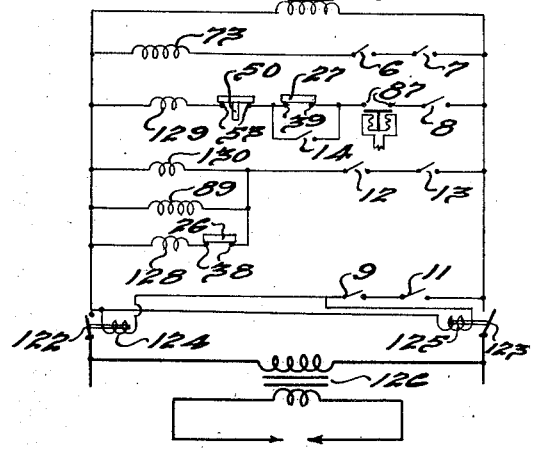
INVENTOR
Frank H. Roby.
BY
ATTORNEY Patented Mar. 24, 1942

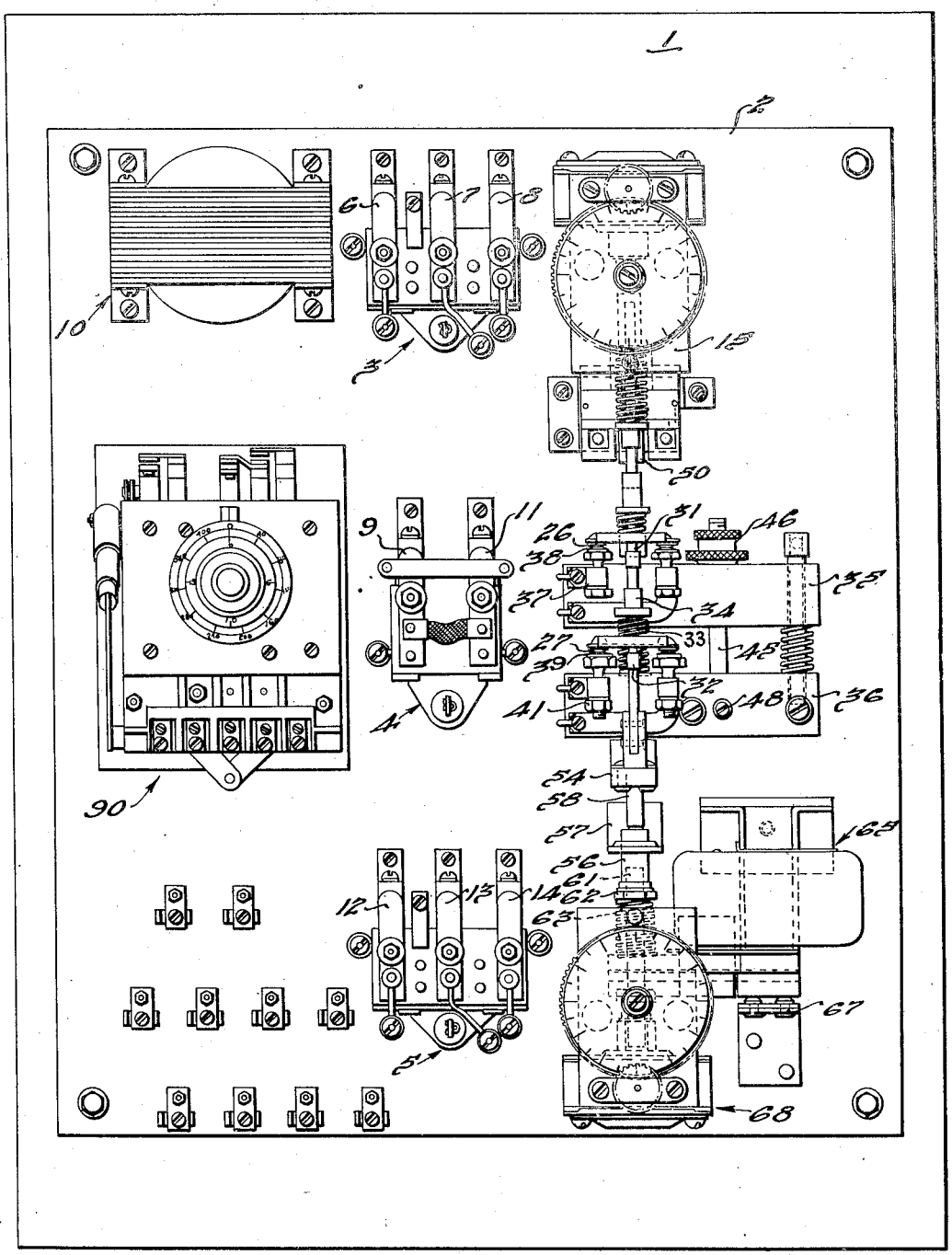

2,277,146

UNITED STATES PATENT OFFICE 2,277,146

SYSTEM OF ELECTRIC WELDING

Frank H. Roby, Milwaukee, Wis., assignor to Square D Company, Detroit, Mich., a corporation of Michigan Application March 4, 1939, Serial No. 259,764

14 Claims. (Cl. 219—4)

This invention relates to a method and system of electric welder control for "persistence" or "interrupted spot" welding in which work to be welded is subjected to a definite predetermined number of current impulses with a period during which current flows, or an "on" period, of predetermined value, and with the periods between "on" periods, or the "cool" periods, of predetermined values, and which may in addition have a predetermined "hold" period during which pressure is maintained by the electrodes on the work after termination of the last current impulse.

This general type of welding is a relatively new one which, in its broader application, is similar to the usual spot welding methods with the exception that the electrodes remain on the work for a considerable period of time during which a series of separate current impulses is supplied. This method of welding has many applications. It is used with excellent results where thick sections of metal are to be joined, where it is rather difficult to raise the metal to fusion temperature without distorting it, and where for ordinary spot welding the transformer sizes would have to be enormous. Also, with these thick metal sections spot welding has sometimes resulted in a brittle weld, since the small volume of fused metal is there surrounded by a large mass of cooler metal which immediately draws off the heat, effecting a quenching of the metal at the weld. With the present method of welding, the metal immediately adjacent the weld has its temperature gradually raised so that the quenching action upon the weld is avoided. Likewise, the welding method is frequently used where narrow strips are to be joined. Special alloys have lent themselves to welding by this method where only unsuccessful results could be obtained by other known welding methods.

It is the object of this invention to provide a method of operation and a system of control therefor which provides adjustment of the "on" and "cool" periods, which automatically controls the number of current impulses or "on" periods applied to the work by a counting device and which terminates the welding cycle after a predetermined number of current impulses have been applied to the work.

Another object of the invention is to provide a method of operation and a system of control in accordance with the preceding object in which provision is made for a controllable "hold" time during which the electrodes are applied to the work after the last current impulse in the welding cycle.

Other objects and features of the invention will be readily apparent to those skilled in the art from the following specification and appended drawings illustrating certain preferred embodiments of the invention in which:

Figure 1 is a front elevational view of a control panel for the method and system according to the present invention.

Figure 2 is a side elevational view of the panel of Figure 1.

Figure 3 is a schematic view of a welding machine to which the system may be applied.

Figure 4 is a schematic view showing the operation of the impulse counter.

Figure 5 is a schematic view showing the internal wiring diagram of the panel in Figures 1 and 2.

Figure 6 is a simplified wiring diagram of the system.

The panel illustrated in Figures 1 and 2 comprises a back supporting plate 1 on which is mounted a removable control board 2. Upon the control board 2 generally centrally thereof are mounted three normally open electromagnetically controlled relays, 3, 4, and 5; relay 3 having three cooperating sets of contacts, 6, 7, and 8; relay 4 having two cooperating sets of contacts, 9 and 11; relay 5 having three cooperating sets of contacts, 12, 13, and 14. To the left of the relay 3 is disposed a step down transformer 10.

A timing switch appears on the control board to the right of the relays 3, 4, and 5 and comprises a supporting plate 15 secured to a shaft 16 by studs 17, the shafts in turn being attached to the control board 2 as by studs. Upon the upper portion of the supporting plate 15 and at the back thereof is disposed a timing chamber 18 of the type that provides for dash up and delayed downward movement through the passage of an enclosed fluid through check and needle valves, movement of the fluid being obtained by cooperating diaphragms and which is fully described in Patent No. 2,124,795. The timing chamber 18 is provided with a needle valve including a longitudinally adjustable pin which is provided with gear teeth at its exterior portion 19. The gear teeth are adapted to mesh with an indicating wheel 20 pivotally attached to supporting plate 15 generally centrally thereof. Secured to the above said longitudinally adjustable pin and adjacent to the gear portion 19 is a fiber disc 21. The fiber disc 21 is manipulable to rotate the said adjustable pin and through the gear portion 19 the indicating wheel 20. A split spring pressed double bushing 22 holds the adjustable pin in its adjusted position. A nut 23 is secured to the diaphragm provided by the timing chamber 18 and an operating rod 24 is threaded into nut 23. To the lower end of the rod 24 is attached a rigid insulating member 25 having mounted thereon spring biased bridging contact elements 26 and 27. Both contact elements face downwardly so as to be opened by the upward stroke of the rod 24. Contact element 26 is biased downwardly by a compression spring 28 disposed intermediate the element and a striker portion 29. Also mounted on the member 25 is a stop 31 which engages the bridging element 26 on the upward stroke of the rod 24 to move the contact element 26 upwardly. The bridging contact element 27 is biased toward stop 32 by a compression spring 33 disposed between the contact element and stop 34. The upward movement of rod 24 forces the contact element 27 upward by the engagement therewith of stop 32. Each of the bridging contact elements 26 and 27 cooperates with a pair of spaced stationary contacts, 38 and 39 respectively, mounted for ready adjustment. The stationary contact elements are mounted on insulating blocks 35 and 36 respectively. Each of the stationary contacts includes a post 37 extending forwardly of its supporting insulating block and having mounted thereon a contact surface secured to the post by a stud 40 threaded therein and maintained in place by a locking nut 41. The arrangement thus described not only provides means for mounting the stationary contacts, but also provides for adjustment of each stationary contact individually where desired. The lower insulating block 36 is rigidly secured to control board 2 as by studs 42 and provides a bearing for a guide rod 43. The guide rod 43 is rigidly secured to the control board 2 and upon it are mounted the contact supporting insulated blocks 35 and 36. A compression spring 44 is disposed upon the guide rod 43 intermediate the blocks 35 and 36 and serve to bias block 35 away from block 36. A similar guide rod (not shown) is disposed in a similar manner directly behind the reciprocating insulated member 25. An adjustment rod 45 extends through blocks 35 and 36 and is provided at its upper extremity with an adjusting nut 46. The lower block 36 is tied to the rod 45 as by a stud 48. Thus, by tightening or loosening the nut 46 to shorten or extend the rod 45, a means is provided for the adjustment of the stationary contacts carried by block 35 through the movement of the said block. An L-shaped bracket 49 disposed near the top of the control board 2 serves to maintain the insulated member 25 in a vertical position while the compression spring 51 disposed between the bracket 49 and a stop 52 provided by the member 25 serves to bias the rod 24 in a downward direction. A conventional normally closed pushbutton switch 53 is secured to the control board 2 beneath the L-shaped bracket 49 and has its operating plunger 50 engageable by the striker portion 29 when the member 25 is moved upwardly to break the circuit through the switch.

The lower extremity of member 25 rests upon an insulated bearing piece 54 which is rigidly secured to a bracket 55. A shaft 56 positioned by a bracket 57 is disposed beneath the member 25 and is provided with an elongated pin portion 58. The pin 58 is adapted to pass through an opening in the insulated bearing piece 54 to engage the lower extremity of the member 25. Thus when shaft 56 is moved upwardly the member 25 will be given a like movement. To the lower end of the shaft 56 is secured a rod 61 as by a nut 62 having thereon a compression spring 63 disposed between the nut 62 and a clapper arm 64 of a magnet 65. The timing relay magnet 65 is located at the lower right of the control board 2 and beneath the insulated block 36.

The clapper arm 64 of the magnet 65 is normally open and is supported by a bracket 67 and carries a brass sheet (not shown) on its contacting face to prevent sealing of the magnet. The lower extremity of the rod 61 is fastened to a time delay element 68 of identical construction as time delay element 18. The element 68 serves to delay the movement of the rod 61 in the upward direction. When the magnet 65 is energized, the clapper arm 64 is immediately drawn upwardly toward the magnet core thus compressing the spring 63 and applying its bias to the shaft 56 and thereby to the insulating member 25. The upward movement of the member is, however, delayed by the timing element 68. As the member 25 moves upwardly under the control of the timing element 68, the stops 31 and 32 come into contact respectively with the contact elements 26 and 27 and break the circuits associated therewith. With a continued upward movement of the element 25 the striker 29 engages the push button plunger 50 and opens the circuit controlled by the push button 53.

Figure 3 is a schematic diagram of a welding machine in which the control and method of the present invention may be applied and carried out. This includes a frame structure 69 having an integral valve chamber 71 controlled by means of the valve slide 72 which is in the form of a solenoid operated by a coil 73. An incoming fluid pressure line is indicated at 74 and the circuit connections to the welder electrodes are indicated at 75 and 76, the circuit connection 75 being connected to the frame 69 and from there making contact to the upper electrode 77, the circuit connection 76 being supported in the frame in an insulator 78 and contacting the stationary welding electrode 79. The work to be welded is indicated at 81. The upper electrode 77 is rigidly connected to a piston 82 disposed within a cylinder 83 rigid with the frame 69. A pressure switch 80 has its pressure chamber 84 connected with the cylinder 83 above the piston 82 and is provided with the bellows 85 operating a bridging contact 86 for the spaced stationary contacts 87. The valve chamber 71, the cylinder 83, and the valve slide 72 are provided with mating parts as shown in Figure 3, and the reciprocations of the piston 82 are effected by means of the movement of the valve slide 72 in response to energization and de-energization of the coil 73. In the position shown in Figure 3 the coil 73 has just been de-energized and the slide 72 has moved downwardly under the influence of gravity to a position where the underside of the piston 82 is connected to the incoming supply. This represents the condition at the conclusion of the welding operation when it is desired to separate the electrodes and remove the work. As the pressure builds up beneath the piston 82 it will move upwardly, moving with it the movable electrode 76 and thus releasing the work 81. When the coil 73 is energized, slide 72 will be moved upwardly, thus registering the incoming supply 74 and valve chamber 71 with the upper side of piston 82. As the pressure builds up it will move the piston 82 downwardly to clamp the work between the electrodes 77 and 79 and, when so clamped, the pressure within the cylinder will build up to a point at which the pressure within the pressure switch chamber is sufficient to effect movement of the switch contact 86 into engagement with the stationary contacts 87. When this occurs, the welding cycle will be initiated, as will be explained hereinafter.

At the left center portion of the control board 2 is mounted an electric counter 90. The electric counter 90 has been illustrated diagrammatically in Figure 4. This counter comprises a clutch solenoid 88 and impulse energized solenoid 89. The solenoid 89 operates a solenoid armature 91 connected to a lever 92 biased upwardly by a spring 93. A pawl 94 is mounted upon the lever 92 and is connected with a ratchet wheel 95 to effect the rotation of the shaft 96. Rigidly mounted for rotation with the shaft 96 is a clutch disc 97 which has, cooperating therewith, a second clutch disc 98 rigid with the shaft 99 which has also keyed thereon the gear wheel 101. The solenoid coil 88 operates upon a solenoid armature 102 connected to a lever 103 biased in a counter-clockwise direction by the spring 104. The lever 103 is provided with a forked portion 105 within which is disposed a collar 106 rigid with the shaft 99 so that rotation of lever 103 effects longitudinal movement of shaft 99. The right hand arm of the forked portion 105 is extended, as at 107, and engages with a second lever arm or striker 108 which has an abutment 109 thereon engageable with the movable contact arm 111. The arm 111 is biased to contact engaged position by means of spring 112. The counter includes a non-rotatably mounted shaft 113 having a threaded portion 114 upon which is mounted an adjustable stop 115 and an elongated gear wheel 116 meshing with the wheel 101 on the shaft 99. Within the elongated wheel 116, and about the shaft 113, is disposed a spring 117 which biases the wheel 116 toward the right and into engagement with the adjustable stop 115.

The operation of the counter may be described as follows:

Energization of the solenoid coil 88 will attract solenoid armature 102 and move lever 103 in a clockwise direction, as viewed in Figure 4. This will release the lever or striker 108 and will permit contact arm 111 to be swung in a clockwise direction under the bias of spring 112 to effect the engagement of the contacts 118 and 119. This movement of the lever 103 will also move the shaft 99 toward the right and will effect engagement between the clutch discs 97 and 98. The solenoid coil 89 will be energized in accordance with the electrical impulses to be counted. Each time coil 89 is energized, the armature 91 will be attracted and will move the lever 92 in a counter-clockwise direction to lower the pawl 94. Upon deenergization of coil 89 the pawl 94 will be moved upwardly by spring 93 and will engage the ratchet wheel 95 to effect the rotation of the shaft 96. As the clutch discs 97 and 98 are now in engagement, this will effect rotation of the shaft 99 and corresponding rotation of the gear wheel 101. As the gear wheel 101 is meshed with elongated gear wheel 116, this will effect rotation of the wheel 116 upon the shaft 113. As the shaft 113 is stationary and the wheel 116 is threaded upon the portion 114 thereof, the wheel 116 will be moved toward the left as it is rotated. This operation continues as the solenoid coil 89 is successively energized and deenergized in response to the impulses to be counted until the wheel 116 engages the striker 108 and moves it into engagement with the contact arm 111 to positively force the contact 118 to its disengaged position. As the wheel 116 is moved along the shaft 113, the spring 117 is compressed. When the coil 88 is deenergized the spring 104 will move the lever 103 in a counter-clockwise direction to effect disengagement of the clutch discs 97 and 98. When this occurs, the energy stored within the spring 117 is expended to rotate the wheel 116 in the opposite direction and effect movement thereof toward the right until it engages the stop 115. The number of impulses to be counted before the contacts 118 and 119 are separated may be readily adjusted by adjusting the initial position of the wheel 116 by varying the position of the stop 115 on the shaft 113. When the coil 88 is deenergized and the wheel 116 thus moves toward the right out of engagement with the striker 116, contacts 118 and 119 are prevented from engaging by the extension 107 on the lever 103 which now engages the striker 108 to maintain the contacts separated.

The actual internal wiring of the control panel is shown in Figure 5 and will be explained in connection with the simplified circuit diagram of Figure 6. In addition to the structure previously described, the system as illustrated in Figures 5 and 6 includes normally open push button 121 and the single pole electromagnetically operated contactors 122 and 123 including operating coils 124 and 125 respectively and connected in the primary side of the welding transformer 126 supplying the welding electrodes 77 and 79. These figures further indicate the operating coil of the control relay 3 at 127; the operating coil of the control relay 4 at 128; the operating coil of the control relay 5 at 129; and the operating coil of the timing relay magnet 65 at 130.

To determine the number of current impulses which are to be transmitted through any given weld, adjustment of the initial position of the elongated gear wheel 116 is made by properly arranging the adjustable stop 115 on the non-rotatable shaft 113.

The duration of a current impulse will be determined by the length of time that the contactors 122 and 123 are closed, and this is determined by the period of time during which contacts 26, 38 are closed during the upward movement of the rod 25. The closing of these contacts during the downward movement of rod 25 does not effect energization of the welding transformer since during this movement the operating coil 129 of relay 5 is deenergized through the contacts 27, 39. Adjustment of this period is normally secured through adjustment of the nut 46 which raises or lowers the contact block 35 to determine the setting of the stationary contacts 38. The adjustment of stationary contacts in their posts 37 is a further means for adjusting their position, but this is normally set and adjustment made by means of the nut 46 to move them bodily on their supporting block 35. The other adjustment of the length of time that the welding contactors are energized to pass current through the weld is determined by the setting of the lower pneumatic time delay unit 68 which controls the speed of upward movement of the rod 25. The adjustment of the unit 68 determines the complete time of the upward movement of the rod 25 which is made up not only of the current impulse time, but also an operation of the time between current impulses which last timing period also forms a hold time for the final impulse. Hence, adjustment of the unit 68 determines the sum total of the time when current is flowing and the hold time, and the adjustment of the position of the stationary contacts determines the relation between the two and finally determines the periods during which the contacts are engaged and the current passes through the weld. The adjustment of the downward movement of the rod through the upper pneumatic time delay unit 15 permits this time of upward movement of the rod to be added to the hold time in the upward movement of the rod to determine the total time between successive current impulses.

The starter button 121 is closed to energize the clutch solenoid 88 of the counter 90 which will move the lever 103 in a clockwise direction as viewed in Figure 4, which will permit the contact arm 111 to move in a clockwise direction under the bias of its spring 112 and effect engagement of its bridging contact 118 with the spaced stationary contacts 119. The closing of the contacts 118 and 119 energizes the operating coil 127 of the relay 3 which closes to energize contacts 6, 7, and 8. The closing of the contacts 6 and 7 energizes the coil 73 of the solenoid valve on the welder machine and initiates the flow of fluid pressure to the fluid motor to apply a clamping pressure to the electrodes against the work to be welded. As the back pressure is built up in the operating cylinder of the fluid motor, the pressure switch 80 is operated to move the switching contact 86 into engagement with the stationary contacts 87 of the switch. This establishes a circuit for the operating coil 129 of relay 5 through the pressure switch contacts 86 and 87, contacts 8 of relay 3, contacts 27, 39 of the timing relay and through switch 53. This energization of coil 129 closes relay 5 and engages contacts 12, 13 and 14. The closing of contact 14 forms a holding circuit about contacts 27, 39 of the timing relay so that relay 5 will remain energized when these contacts are separated. The closing of contacts 12 and 13 effects energization of operating coil 130 of magnet 65 of the timing relay and of solenoid coil 89 of the counter and energizes operating coil 128 of relay 4 through contacts 26, 38 of the timing relay. The energization of coil 128 closes relay 4 and engages contacts 9 and 11 which close the control circuit to coils 124 and 125 of welder contactors 122 and 123 to energize the primary of transformer 126 and initiate flow of the welding current. The energization of solenoid coil 89 of the counter does nothing at this time, as it is the deenergization of this coil which effects the movement of the pawl 94. This manner of operation is desired in order that the last current impulse shall be completed. The energization of coil 130 of magnet 65 pulls the clapper armature arm 64 upwardly to place the bias of spring 63 upon rod 25, whereupon the rod moves upwardly at a rate determined by the setting of the lower pneumatic time delay unit 68.

As the rod 25 moves upwardly, it first effects separation of the contacts 27, 39, but this has no effect upon the operating coil 129 of relay 5 since these contacts are shunted by the holding circuit closed by the contact 14. Continued upward movement of the rod 25 then separates contacts 26, 38 which effects deenergization of the operating coil 128 of relay 4 which opens to separate these contacts 9 and 11 to deenergize operating coils 124 and 125 of the welder contactors 122 and 123 which open to deenergize the welding transformer 126 and interrupt the flow of current through the weld. The rod 25 continues its upward movement until it engages the plunger 50 of the push button switch 53 which then opens to deenergize the operating coil 129 of relay 5. The opening of relay 5 disengages contacts 12, 13, and 14 which effects deenergization of the operating coil 130 of the timing switch operating magnet 65 and of the solenoid coil 89 of the counter 90. Deenergization of the solenoid coil 89 permits the pawl 94 to be moved upwardly by compression spring 93 and the pawl engages ratchet wheel 95 to rotate the same and, through the shafts 96, 99 and wheel 101, to effect rotation of the elongated gear wheel 116 as previously described. The deenergization of the operating coil 130 of magnet 65 releases the bias of spring 63 upon the rod 25 and it coasts downwardly under the combined action of gravity, and spring 61, and at a rate determined by the setting of the upper pneumatic time delay unit 18 as the rod 25 coasts downwardly it successively closes the circuit through push button switch 53 and the circuits through the contacts 26, 38 and 27, 39. In this downward movement of the rod 25, nothing happens until the contacts 27, 39 are closed, at which time the operating coil 129 of relay 5 is energized and the relay closes to engage contacts 12, 13, and 14 whereupon the operating coil 130 of the timing relay is again energized, the solenoid coil 89 of the counter is energized and the operating coil 128 of relay 4 is energized to effect closing of the welding electrodes and the initiation of a new timing cycle. This operation with periodic passing of current impulses through the weld continues until the elongated gear wheel 116 has been moved to the left as viewed in Figure 4, until it effects opening of the contacts 118, 119. Opening of these contacts deenergizes the operating coil 127 of relay 3 which opens to separate contacts 6, 7, and 8. Opening of these contacts deenergizes the operating coil 73 of the solenoid valve of the welder machine and also opens the circuit to the operating coil 129 of relay 5. This relieves the pressure upon the welding electrodes and prevents subsequent energization of the welding contactors since it prevents the energization of the coil 129 and closing of the relay 5. The deenergization of the operating coil 73 of the solenoid valve places a source of fluid pressure in communication with the reverse side of the operating piston of the welder to effect movement of the welder electrode 77 out of engagement with the work and the welding operation is completed.

It is thus seen that a definite control is provided for applying a predetermined number of current impulses of predetermined duration to the material to be welded. The number of current impulses is determined by the setting of the counter 90 and the duration of any one impulse is determined by the time of movement of the rod 25 from the energization of the operating coil 130 or the operating magnet 65 until the contacts 26, 38 are separated. The duration of the period between successive impulses is determined by the time of operation of the rod between the opening of the contacts 26, 38 and the closing of the contacts 27, 39 which is made up of the upward movement of the rod between opening of contacts 26, 38 and the opening of the circuit through the switch 53 and the downward movement of the rod until contacts 27, 39 are engaged. It is also to be noted at the completion of the last current impulse, when the contacts 26, 38 are separated, that the welding pressure is not immediately released but is maintained for a HOLD time determined by the time of travel of the rod 25 between the opening of the contacts 26, 38 and the opening of the circuits through the switch 53.

To initiate another welding cycle, contacts 118 and 119 must be closed and this cannot be effected until the push button 121 has been released and reclosed after the welding operation since the lever 109 cannot be disengaged from the contact arm 111 until the gear wheel 116 is moved out of engagement with the lever 109. With the releasing of push button 121, the clutch solenoid 88 is deenergized, the clutch discs 97 and 98 are forced apart under the action of the spring 104 and the spring 117 causes the gear wheel 116 to rotate to the right under its bias until it engages the stop 115 and lever 109 is thereby free to move to the right and permit the closing of contacts 118 and 119 when the clutch solenoid 88 is energized by push button 121. It is, therefore, evident that the complete control of the welding operation is taken away from the operator and that the welder system will perform in the manner determined by the adjustment of the control prior to placing it in operation, regardless of the continued maintaining of the push button 121. It is also seen that once the push button 121 is closed to initiate a welding cycle, release thereof, while the cycle is in progress, will not interrupt the cycle since the closing of contacts 118 and 119 provides a holding circuit around the start push button.

It can be seen that the method and system, according to the present invention, provides a definite predetermined control for the persistence welding operation in which a definite predetermined number of current impulses is transmitted to the work to be welded and in which the "on" and "cool" periods of the current impulses are readily adjusted and will have predetermined values in the welding cycle. Further, that the system embodies a complete control and operates automatically to perform the predetermined number of current impulses of predetermined periods of duration, independently of the machine operator.

While certain preferred embodiments of the invention have been specifically described and illustrated, it is understood that the invention is not limited thereto as many variations will be readily apparent to those skilled in the art and the invention is to be given its broadest possible interpretation within the terms of the following claims.

What is claimed is:

1. A control system for an electric welder having electrodes adapted to be clamped against the work and to transmit current through the work to perform the welding operation, comprising means for initiating the pressing of said electrodes against work to be welded, means for periodically energizing said welding electrodes, means for counting the number of impulses transmitted to the electrodes, and means for discontinuing the current impulses after a predetermined number have been transmitted, said counting means being readily adjustable to selectively vary the number of impulses transmitted.

2. A control system for an electric welder having electrodes adapted to be clamped against the work and to transmit current through the work to perform the welding operation, comprising means for initiating the pressing of said electrodes against work to be welded, means for transmitting a series of current impulses through the work between said electrodes, means for adjusting the duration of the current impulses and of the periods therebetween independently of each other, means for discontinuing said current impulses after a predetermined number has been transmitted through the work including means for selectively varying said number, and means for releasing said electrode pressure to complete the welding operation.

3. A control system for an electric welder having electrodes adapted to be clamped against the work and to transmit current through the work to perform the welding operation, comprising means for initiating the pressing of said electrodes against work to be welded, means for thereafter initiating a series of current impulses transmitted through the work between the electrodes, means for counting said current impulses and for discontinuing the series at the conclusion of a predetermined number of impulses including means for selectively varying said number, and means for releasing the electrode pressure to complete the welding operation.

4. A control system for an electric welder having electrodes clamped against the work by fluid pressure and to transmit current through the work to perform the welding operation, comprising means for initiating the supply of fluid pressure to said electrodes to press them against the work to be welded, means operable when a predetermined pressure on the electrodes has been attained to initiate the supply of welding current through the work, means for periodically interrupting and reestablishing said supply of welding current with "on" periods of common predetermined duration and "off" periods of common predetermined duration, means operating to discontinue the reestablishment of welding current after a predetermined number of "on" periods have been effected including means for selectively varying said number, and means for releasing the electrode pressure to complete the welding operation.

5. A welder control system for electrically welding work by passing current therethrough between electrodes pressed against the work by fluid pressure which comprises means for initiating the supply of fluid pressure to said electrodes, cooperating contacts cyclically engaged and disengaged for periods of predetermined duration, means placing the supply of welding current through the electrodes in said cyclically operated contacts when a predetermined electrode pressure has been attained, means for counting the number of current impulses transmitted through the work, as said contacts are thereafter cyclically engaged and disengaged, including means for discontinuing the control of current by said cyclically operated contacts and the application of the fluid pressure to the electrodes after a predetermined number of current impulses have been transmitted through the work, said counting means being readily adjustable to selectively vary the number of impulses transmitted.

6. A control system for an electric welder having electrodes adapted to be clamped against the work and to transmit current through the work to perform the welding operation, comprising means for initiating the pressing of said electrodes against work to be welded, means for periodically energizing said welding electrodes, means for counting the number of impulses transmitted, means for discontinuing the current impulses after a predetermined number have been transmitted, and means for maintaining the pressure of the welding electrodes against the work for a predetermined time interval after the last deenergization of the electrodes, said counting means being readily adjustable to selectively vary the number of impulses transmitted.

7. A control system for an electric welder having electrodes adapted to be clamped against the work and to transmit current through the work to perform the welding operation, comprising means for initiating the pressing of said electrodes against work to be welded, means for thereafter initiating a series of current impulses transmitted through the work between the electrodes, means for counting said current impulses and for discontinuing the series at the conclusion of a predetermined number of impulses including means for selectively varying said number, and means for releasing the pressing of said electrodes against the work after a predetermined time interval after the termination of the last impulse.

8. A control system for an electric welder having electrodes clamped against the work by fluid pressure and to transmit current through the work to perform the welding operation, comprising means for initiating the supply of fluid pressure to said electrodes to press them against the work to be welded, means operable when a predetermined pressure on said electrodes has been attained to initiate the supply of welding current through the work, means for periodically interrupting and reestablishing said supply of welding current with "on" and "off" periods of predetermined and independently adjustable duration, means operating to discontinue the reestablishment of welding current after a predetermined number of "on" periods have been effected including means for selectively varying said number, and means for releasing the electrode pressure after a predetermined time interval after the completion of the last "on" period.

9. A control system for an electric welder having electrodes adapted to be clamped against the work and to transmit current through the work to perform the welding operation, comprising means for initiating the pressing of said electrodes against work to be welded, means for periodically energizing said welding electrodes, means for counting the number of impulses transmitted to the electrodes, said counting means operating to register the passage of an impulse upon termination of said impulse, and means for discontinuing the current impulses after a predetermined number have been transmitted, said counting means being readily adjustable to vary the number of current impulses transmitted.

10. A control system for an electric welder having electrodes adapted to be clamped against the work and to transmit current through the work to perform the welding operation, comprising means for initiating the pressing of said electrodes against work to be welded, means including a time delay relay for thereafter initiating a series of current impulses transmitted through the work between the electrodes, said time delay relay determining the duration of each of said current impulses, means for counting said current impulses and for discontinuing the series at the conclusion of a predetermined number of impulses including means for selectively varying said number and means for releasing the electrode pressure to complete the welding operation.

11. A control system for an electric welder having electrodes adapted to be clamped against the work and to transmit current through the work to perform the welding operation, comprising means for initiating the pressure of said electrodes against work to be welded, means energizing the electrodes to pass current through the work, means energizing a timing relay, means under the control of said relay for effecting deenergization of the electrodes after a predetermined interval, means deenergizing said relay and reenergizing said electrodes and relay after a predetermined time interval, and means for continuing the energization and deenergization of said electrodes and timing relay for a predetermined number of electrode energized periods and for terminating the series after said predetermined number has been accomplished including means for selectively varying said number.

12. A control system for an electric welder having electrodes adapted to be clamped against the work and to transmit current through the work to perform the welding operation, comprising means for initiating the pressing of said electrodes against the work to be welded, means for periodically energizing said welding electrodes, progressively movable means connected to be moved a predetermined distance in response to each electrode energization, means operated by said progressively movable means when it has moved a predetermined variable distance for discontinuing the energization of the electrodes, and means for selectively varying said distance to vary the number of electrode energizations effected.

13. A control system for an electric welder having electrodes adapted to be clamped against the work and to transmit current through the work to perform the welding operation, comprising means for initiating the pressing of said electrodes against the work to be welded, means for thereafter initiating a series of current impulses transmitted through the work between the electrodes, progressively movable means connected to be moved a predetermined distance at the expiration of each current impulse, means for terminating the transmittal of said current impulses when said progressively movable means has moved a predetermined variable distance, and means for selectively varying said distance to vary the number of electrode energizations effected.

14. A control system for an electric welder having electrodes adapted to be clamped against the work and to transmit current through the work to perform the welding operation, comprising means for initiating the pressing of said electrodes against the work to be welded, means energizing the electrode to pass current through the work, means energizing a timing relay, means under the control of said relay for deenergizing the relay and for reenergizing both the relay and the welder electrodes after a predetermined time interval, means for continuing the energization and deenergization of said electrodes and timing relay, progressively movable means connected to be moved a predetermined distance in response to each electrode energization, means for discontinuing the reenergizing of the electrodes and timing relay when said progressively movable means has been moved a predetermined variable distance, and means for selectively varying said distance to vary the number of electrode energizations effected.

FRANK H. ROBY.

DISCLAIMER 2,277,146.—*Frank H. Roby*, Milwaukee, Wis. SYSTEM OF ELECTRIC WELDING. Patent dated March 24, 1942. Disclaimer filed May 21, 1943, by the assignee, *Square D Company*.

Hereby enters this disclaimer to claims 1, 2, 3, 4, 5, and 12 in said specification.

[*Official Gazette June 15, 1943.*]